Figure 1:
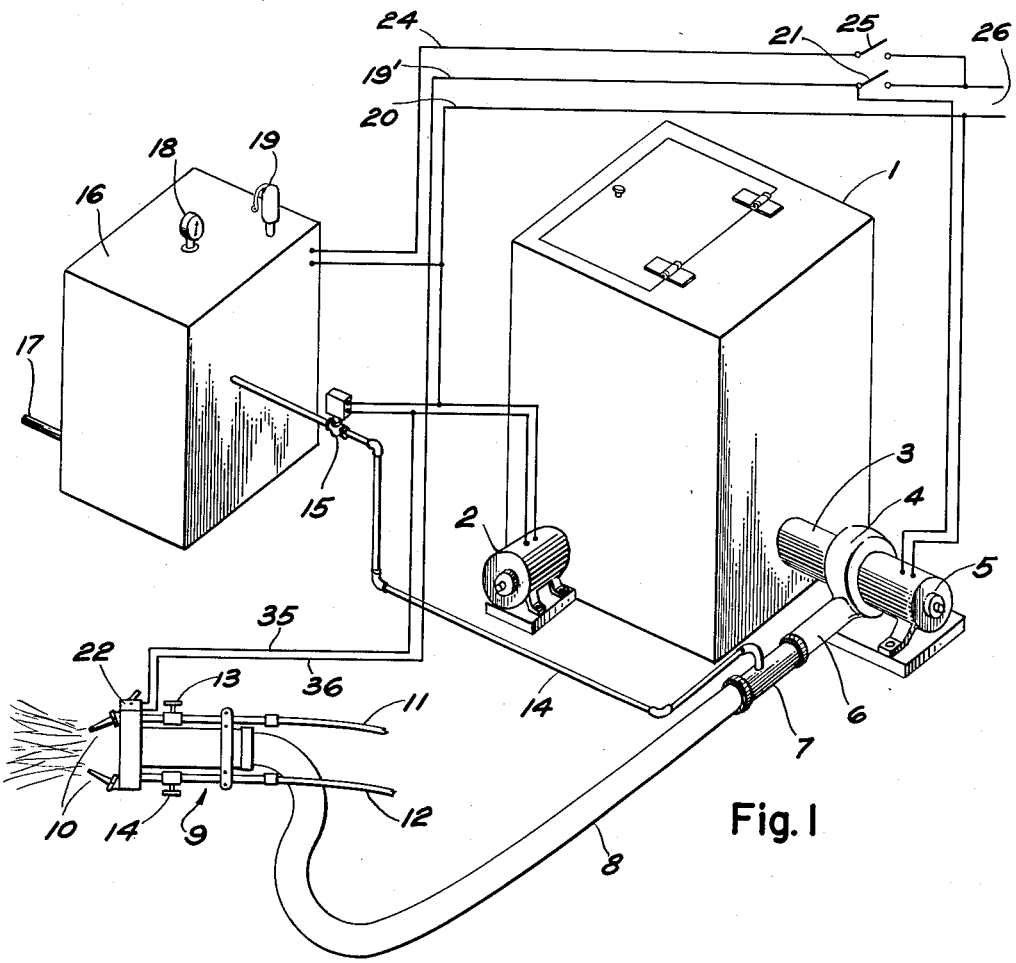

Dec. 12, 1961   J. L. KEMPTHRONE   3,012,732
DUST CONTROL
Filed May 13, 1959

INVENTOR.
JAMES L. KEMPTHORNE
BY
AGENT.

United States Patent Office
3,012,732
Patented Dec. 12, 1961

3,012,732
DUST CONTROL
James L. Kempthorne, 62B Troy Drive, Springfield, N.J.
Filed May 13, 1959, Ser. No. 813,001
3 Claims. (Cl. 239—300)

My invention relates to a method of and an apparatus for the control of dust.

As my invention is particularly advantageous in controlling the dust which occurs when spraying finely-divided insulating or acoustical material, such as asbestos, onto a surface to be coated therewith, I shall describe the same with respect thereto. However, my invention is not limited to such spraying, but is applicable to other instances where it is desirable or necessary to control dust.

As is well known, for instance from my U.S. Patent 2,676,059, it is well known to transport a mixture of finely-divided material, such as asbestos fibers and cementitious material, through a tube by means of an air stream and project the same onto a surface to be coated. The end of the tube carries a spray head provided with one or more nozzles to which is supplied compressed air and water and which produces a spray which moistens the finely-divided material while in mid-air. As has been stated in the above-mentioned patent, considerable difficulties are encountered due to the dust which results when the fibers tend to "flower out" upon leaving the spray head. This dust not only presents a health problem to the operator, but also results in loss of material due to "fall out." In addition the dust settles in undesired places which necessitates an expensive and time-consuming cleaning-up process.

In my above-mentioned patent, as well as in Patent 2,754,155, it has been proposed to control the dust by injecting a stream of atomized water into the air stream carrying the asbestos fibers and cementitious material while the latter is being blown through the tube. For this purpose it was proposed to merely atomize water through an opening in the side of the tube or by means of a nozzle within the tube and having an inner opening for the supply of water and a surrounding opening for the supply of air. In such cases the amount of air and water supplied had to be controlled by hand valves which required a considerable amount of the operator's time. I have found that such a means of controlling the dust was unsatisfactory even if the supply of water and air were maintained in correct adjustment. However, in practice it was difficult or impossible to keep the adjustment correct at all times because of changes in the water supply pressure and the pressure of the compressed air. As a result, it frequently happened that water collected in the atomizing nozzle and caused fiber to collect which in turn caused clogging of nozzle and prevented proper atomization of the water.

I have found that the above difficulties are overcome and one obtains a phenomenal decrease in the amount of dust produced when, in accordance with my invention, a stream or jet of steam is injected into a stream of gas, such as air, carrying the finely-divided material, preferably while the gas stream passes through a confining member. The steam is preferably injected at the central part of the gas stream, and in the direction of flow thereof and good results are obtained when using steam at a pressure between about 75 to 90 pounds per square inch, although in some cases even higher pressures are desirable.

The steam may be provided by means of a generator of any of the well-known types which may be either gas, oil, or electrically operated and provided with any of the well-known controls to adjust the pressure and automatically maintain the same at the proper value. I prefer to control the flow of the steam so that it will be turned on when the material starts to flow and vice versa, and this may be effected by means of an electrically-operated valve for the steam and suitable control circuits actuated by the workman.

Figure 2:
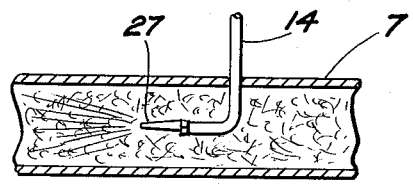

In order that my invention may be clearly understood and readily carried into effect, I shall describe the same in more detail with reference to the accompanying drawing, in which FIGURE 1 is a perspective view of an insulation spraying apparatus embodying the invention, and FIG. 2 is a sectional view on an enlarged scale of a portion of the pre-wetting chamber used in the apparatus shown in FIGURE 1.

Figure 3:
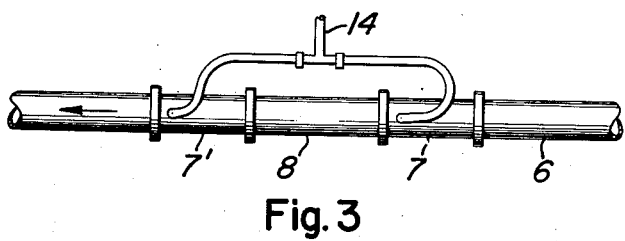

FIGURE 3 shows a portion of the conduit with a plurality of the prewetting chambers as used in the apparatus of FIGURE 1.

The spraying apparatus shown in FIGURE 1 comprises a hopper and mixing device 1 driven by an electric motor 2 and having an outlet 3. The device 1 serves to mix, and in some cases card not shown, the insulation material to be sprayed which may be any of the well-known materials, such as a mixture of asbestos fibers and cementitious material. As such devices are well known in the art and are of various constructions, a suitable device being described in my U.S. Patent 2,504,533, further illustration and description of the same are believed to be unnecessary.

Connected with its intake port to the outlet 3 is a centrifugal air blower 4 driven by an electric motor 5 and having an outlet 6 through which the finely-divided material supplied by device 1 is transported by an air stream.

In accordance with the invention the material is pre-wet with steam and for this purpose a pre-wetting or confining chamber 7 has one end connected to the end of outlet 6. To the other end of chamber 7 is connected a flexible hose 8 whose other end carries a spray head 9. The chamber 7 may be omitted and the stream injected into the tube 8 at any convenient point. Head 9, which may be of any of the constructions used for this purpose, such as that described in my U.S. Patent 2,585,133, is provided with a plurality of nozzles 10 (only two being visible) which wet the material being sprayed in mid-air and also serve to "box-in" the stream of particles. For this purpose the nozzles 10 are connected to an internal chamber in the head to which water and compressed air are supplied through tubes 11 and 12 respectively from suitable supply sources (not shown). The amounts of water and compressed air supplied to the chamber are manually adjusted by means of adjusting valves 13 and 14. In some cases a liquid adhesive may be used instead of the water. Head 9 carries a single-pole electric switch 22 to be referred to later.

In accordance with the invention steam is supplied to the chamber 7 by means of a pipe 14 connected through an electrically-operated valve 15 to the outlet of a steam generator 16. Generator 16 is supplied with water through a pipe 17 connected to a suitable supply (not shown) and is provided with a pressure gage 18 and a valve 19 which serves to adjust the pressure of the steam and also as a safety valve.

Generator 16 is shown as being of the electric type and has one of its supply terminals connected through a lead 24 and a single-pole switch 25 to one terminal of a supply 26 whose other terminal is connected through a lead 20 to the other terminal of the generator. Motors 2 and 5 have one terminal connected to lead 20. Motor 5 has its other terminal connected to lead 19' which is connected through a switch 21 to the supply terminal 26. The electrically-operated valve 15 has one terminal connected to lead 20 and its other terminal connected to lead 35, switch 22 and lead 36 to conductor 19'. Motor 2 has its other terminal connected through lead 35 to switch 22. Thus in operating the apparatus switch 25 is first closed and when steam at the desired pressure has been generated, switch 21 is closed to thereby energize motor 5. Switch 22 is then closed to thereby start motor 2 and supply the finely-divided material and at the same time to open valve 15 whereby the steam is supplied to the chamber 7.

As shown in FIGURE 2 the finely-divided material is being transported by an air stream in the direction of the arrows. The steam supplied through the pipe 14 is sprayed from a nozzle 27 to form a jet which travels generally in the direction of the flow of the finely-divided material. Because of the pressure used and the fact that it travels in the same direction as the finely-divided material, the steam condenses at some distance, for instance several feet, from nozzle 27 and thus there is no danger of moisture forming on the nozzle and collecting the material. In addition, the pressure of the steam is automatically controlled so that the pre-wetting continues in a uniform manner and does not require any adjusting.

While I have obtained excellent results with a single nozzle of the type shown in FIGURE 2, it may be preferable in some cases to use a plurality of nozzles spaced apart in chamber 7, or one in each of several interspaced chambers, as may be seen by reference to FIGURE 3.

While I have described my invention in connection with specific examples and certain applications, I do not desire to be limited thereto as obvious modifications will present themselves to one skilled in the art.

What I claim is:

1. An apparatus for controlling dust in the art of sprayed insulation comprising a hopper adapted to contain finely divided fiber such as asbestos, mineral wool, vermiculite, perlite, mixed with binders, an air blower, a first conduit connecting the air blower with the hopper adapted to conduct the fiber from the hopper to the air blower, a second conduit conducting the fiber in an air stream, a steam generator communicating with the second conduit through a pipe admitting steam into said second conduit, said pipe having a solenoid valve controlling the flow of steam through said pipe, the said communication being at a point intermediate the ends of said second conduit, the steam being introduced into the second conduit by said pipe having its terminal end positioned centrally of the second conduit and directed in the direction of and parallel with the flow of the finely divided fiber, convergent spray nozzles positioned adjacent the down stream end of the second conduit, the fiber being discharged at the end of the conduit in the path of fluid flowing through said converging spray nozzles.

2. In a substantially non-clogging apparatus as set forth in claim 1, an electric motor actuated mixing device in said hopper, an electric switch located adjacent the discharge end of the second conduit, said switch simultaneously controlling the motor actuated mixing device and said solenoid valve.

3. In a structure described in claim 1, said second conduit having admitting pipes so that the steam is admitted in the second conduit in more than one position along the length of the conduit.

References Cited in the file of this patent

UNITED STATES PATENTS

| | | |
|---|---|---|
| 669,409 | Dunn | Mar. 5, 1901 |
| 1,165,971 | McClave | Dec. 28, 1915 |
| 1,513,622 | Manning | Oct. 28, 1924 |
| 1,881,345 | Beatty | Oct. 4, 1932 |
| 2,255,189 | Robinson | Sept. 9, 1941 |
| 2,503,743 | Keefer | Apr. 11, 1950 |
| 2,676,059 | Kempthorne | Apr. 20, 1954 |
| 2,754,155 | Kempthorne | July 10, 1956 |
| 2,819,930 | Foreman | Jan. 14, 1958 |